Sept. 6, 1932.     H. W. LANGBEIN     1,876,307
METHOD AND APPARATUS FOR HANDLING MOTOR VEHICLES
Filed May 8, 1929
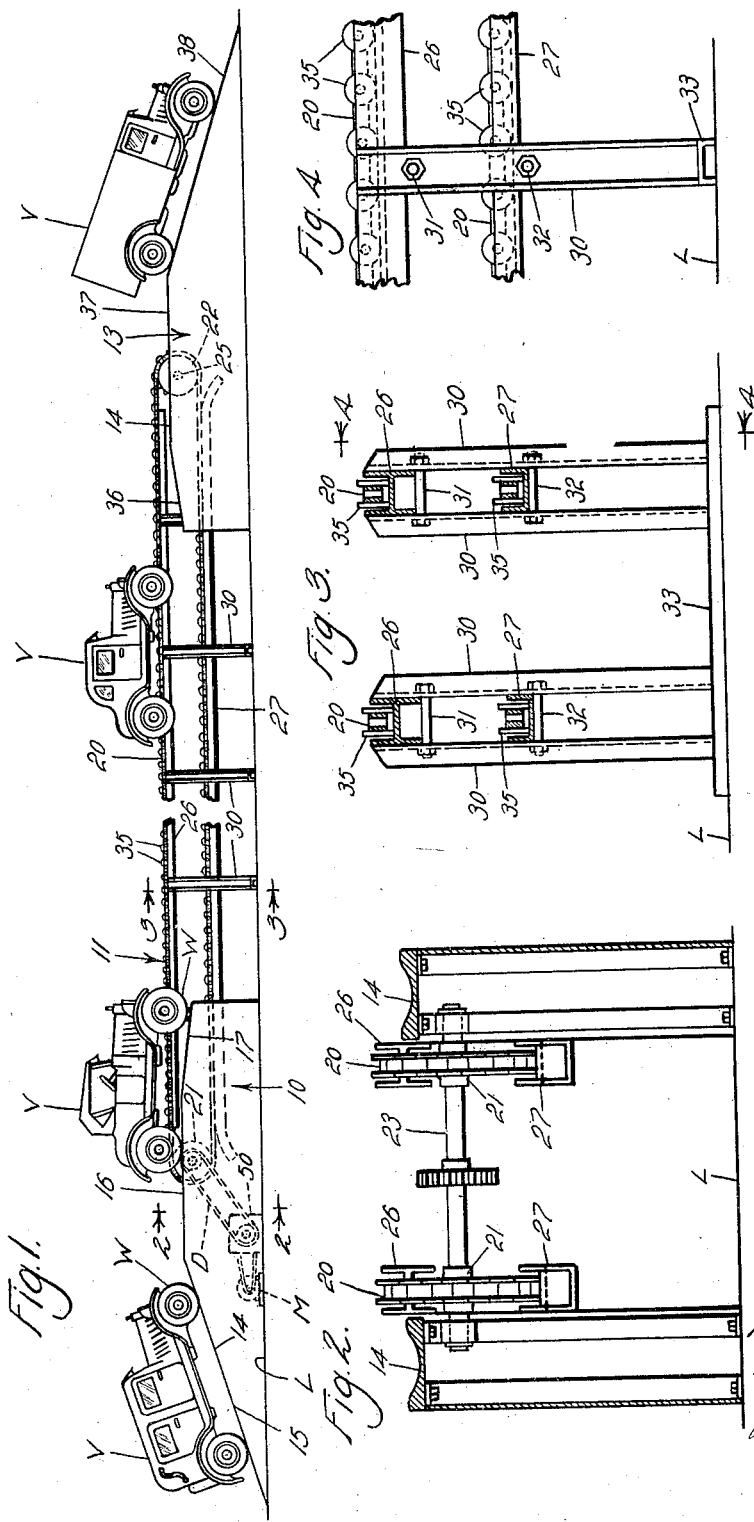

Patented Sept. 6, 1932

1,876,307

UNITED STATES PATENT OFFICE

HAROLD W. LANGBEIN, OF LOS ANGELES, CALIFORNIA

METHOD AND APPARATUS FOR HANDLING MOTOR VEHICLES

Application filed May 8, 1929. Serial No. 361,439.

This invention has to do with a method and apparatus for handling motor vehicles and it is an object of the invention to provide for the efficient, practical handling of motor vehicles to facilitate repair or servicing.

Motor vehicles, for example, automobiles, require occasional inspection and service; for instance, it is customary to occasionally go over the chassis of a motor vehicle to inspect and tighten parts and to lubricate the various working parts. With the ordinary methods this requires taking the car out of service for a considerable period of time, it being customary to perform these operations in a garage equipped with a pit or rack which allows the car to be arranged in position so that a mechanic can work under it.

In accordance with this invention, a motor vehicle is handled so that the operations that I have referred to are performed efficiently and economically in a very short time through the elevation of the vehicle, the transportation or conveying of the vehicle slowly in an elevated position while it passes the stations of mechanics or service men who perform specialized operations, and then the return of the vehicle to normal or original level, say, for instance, the ground level. By this invention a continuous handling of vehicles may be carried on, each vehicle receiving thorough and efficient service, and the complete handling of each vehicle being performed in a definite period of time.

It is a general object of the invention to provide a method whereby a vehicle is handled quickly and in a very efficient, practical manner.

Another object of the invention is to provide apparatus for carrying out the method of this invention, which apparatus is simple and inexpensive of construction, efficient and durable.

A further object of the invention is to provide apparatus of the character described operable to handle a motor vehicle so that its wheels are loose, or free, so that they can be thoroughly serviced, in fact, removed, if necessary.

It is a further object of the invention to provide apparatus of the character mentioned which is simple of construction and operation and which handles motor vehicles in the manner mentioned above without the operation or manipulation of complicated or inconvenient devices.

The various objects and features of my invention will be best and more fully understood from the following detailed description of a typical form and application of the invention, throughout which description reference is had to the accompanying drawing, in which:

Fig. 1 is a side elevation of a typical form of apparatus embodying the invention showing motor vehicles in various positions in the course of being handled by the apparatus. Fig. 2 is an enlarged detailed sectional view of the apparatus taken as indicated by line 2—2 on Fig. 1. Fig. 3 is an enlarged detailed transverse sectional view taken as indicated by line 3—3 on Fig. 1, and Fig. 4 is a side elevation of a part shown in Fig. 3, being a view taken as indicated by line 4—4 on Fig. 3.

In accordance with the method provided by this invention, a motor vehicle is first operated, say, elevated to a position where its wheels are above the normal or ground level, and is then advanced or conveyed horizontally with its wheels free and so that the various parts of its chassis are readily accessible for inspection, tightening, lubrication, etc. Upon completion of the desired operations or servicing, the vehicle is returned to position for normal operation, say, for instance, by returning its wheels to a support and operating it to a position ready for operation by its own power. In accordance with the preferred form of the invention the vehicle is initially elevated a substantial distance above the normal or ground level, so that it is conveyed horizontally a substantial distance above the ground, in fact, high enough above the ground so that workmen can operate under it conveniently and in a manner to efficiently and thoroughly perform the various desired operations. Further, in accordance with the preferred form of the invention, the vehicle is advanced horizontally at a predetermined speed and along a definite, say, for instance, straight course.

Workmen or service men and suitable equipment may be stationed along the course that the vehicle travels so that the various described operations are performed on the vehicle when it is elevated so that its chassis is readily accessible and when its wheels and steering gear are free.

It is believed that the various phases of the method will be fully understood and appreciated from a description of the apparatus, and therefore I will proceed with a detailed description of a typical and preferred form of apparatus without going further into the various phases of the method.

The apparatus provided by the invention includes, generally, means 10 for elevating the vehicle, that is, for positioning the vehicle so that it is clear or above the normal level, say, for instance, the ground level L, means 11 for advancing or conveying the vehicle in the elevated position with its wheels free, means 13 to return the vehicle to normal position, that is, to position where its wheels are in ground engagement and it is ready to be operated under its own power.

In considering the invention and in the following description reference will be made to the ground L as being horizontal and of uniform elevation, and when the term "elevation" is used it refers to vertical movement with reference to the level L. In the particular form of the invention illustrated, where the level L is of constant elevation, the means 10 operates to lift or move the vehicle up to a position above the level L.

Various forms of apparatus, power means, or devices may be used to elevate the vehicle, it being preferred to provide an inclined runway as illustrated in Fig. 1 of the drawing. In this particular form of the invention the means 10 includes spaced trough-like tracks 14 adapted to receive the wheels W of a vehicle V. The tracks 14 have upwardly inclined portions 15 extending upwardly from the level L, substantially horizontal portions 16 extending from the upper ends of the portions 15, and have downwardly inclined portions 17 extending from the horizontal portions 16.

With the form of runway illustrated in Fig. 1, a vehicle V can be operated along the inclined portions of the tracks 14 to an elevated position where it is supported by the horizontal portions 16 of the tracks, and upon continued advancement it is allowed to lower somewhat as it advances onto the downwardly inclined portions 17 of the tracks. It is to be understood, of course, that the tracks 14 may be of any suitable construction and that they may be made in the form of guides or troughs which will carry the wheels W of a vehicle so that the vehicle does not become displaced from the means 10.

The means 11 provided for conveying the vehicle horizontally with its wheels W free, is arranged to receive the vehicle from the elevating means 10 and to carry the vehicle to the means 13. In accordance with the broader principles of the invention, various devices or forms of construction may be employed in the means 11, it being preferred to make this means in the form of an endless belt or chain conveyor. In the particular form of the invention illustrated the means 11 includes two chains 20 extending between sprockets 21 at the means 10 and sprockets 22 at the means 13. The sprockets 21 are carried in spaced relation on a shaft 23 extending transversely of the tracks 14 in position so that the uppermost parts of the sprockets project somewhat above the horizontal portions 16 of the trackways but are not high enough to be engaged by the parts of vehicles on the horizontal portions 16 of the tracks 14. The two sprockets 21 are spaced apart and are located between, for instance, immediately inside the tracks 14, as clearly shown in Fig. 2 of the drawing. The chains 20 are carried on the sprockets 21 so that they have upper or vehicle carrying portions extending horizontally from the uppermost parts of the sprockets 21 beyond the downwardly inclined track portions 17 and to the means 13. The sprockets 22 at the means 13 are carried on a shaft 25 and are spaced corresponding to the sprockets 21.

In accordance with the preferred form of the invention, supports or guides 26 are provided for the upper or vehicle carrying portions of the chains 20, and guides 27 are provided for the lower or return portions of the chains. The guides 26 extend horizontally from points adjacent the sprockets 21 to points adjacent the sprockets 22 so that the vehicle carrying portions of the chassis are effectively supported in horizontal position from one end of the means 11 to the other. In the construction illustrated I employ I beams for the guides 26 and arrange the beams so that the webs are horizontal while the flanges at one side of the web project upwardly to guide the chains. This construction is clearly shown in Fig. 3. Supports or uprights 30 are arranged at opposite sides of the beams and bolts 31 are arranged between the uprights 30 and under the beams, as clearly shown in Fig. 3. The return guides 27 may be channel beams arranged to face upwardly and located between the uprights 30 to be supported on bolts 32 extending between the uprights, as illustrated in Fig. 3. The uprights 30 may be attached to base plates 33 so that the guides 26 and 27 are supported in the proper spaced relation.

In the preferred form of the invention I employ chains 20 equipped with supporting rollers 35 so that the chains roll through the guides 26 and 27 and project above the flanges of the guides to support the vehicle V.

The means 13 illustrated in the drawing may include a track construction similar to the means 10 except that the tracks have upwardly inclined portions 36 located at or overlapping the delivery end of the means 11, horizontal portions 37 continuing somewhat beyond the delivery end of the means 11, and portions 38 for returning the vehicle to whatever elevation may be desired. In the case illustrated the portions 38 are inclined to extend downwardly to return the vehicles to the level L, as clearly shown in Fig. 1.

The invention provides, in addition to the principal parts above described, means for driving the conveyor chains 20 so that their upper or vehicle carrying portions advance or move from the means 10 to the means 13. In the form of the invention illustrated I provide power means in the form of a motor M and I provide a drive D between the motor M and the shaft 23 so that the shaft is rotated at the desired speed. The drive D may include a suitable speed reduction mechanism 50 which allows the motor M to operate at a high speed to drive the shaft 23 slowly. In practice it is desired to rotate the shaft 23, and therefore the sprocket 21, slowly, so that the vehicle carrying portions of the chains advance slowly, giving the workmen located between the means 10 and 13 ample time to perform the necessary operations on the vehicle.

In operation a vehicle V, to be serviced, repaired, or otherwise worked upon, is operated up the inclined portions 15 of the tracks 14 over or along the horizontal portions 16 and onto the downwardly inclined portions 17. The vehicle may thus be operated under its own power, or, if desired, special means may be provided for thus operating the vehicle. As the vehicle moves along the downwardly inclined portions 17 of the tracks 14 it lowers until it rests upon the vehicle carrying portions of the chains 20. Most vehicles are so constructed as to cause the axles to engage the vehicle carrying portions of the chains, therefore the vehicle, upon passing from the means 10 onto the means 11, is engaged at the axles by means of the chains 20. The chains 20, being effectively supported in a horizontal position by the guides 26 and being operated through the drive means above described, operate to carry the vehicle horizontally from the means 10 to the means 13, the advancement of the vehicle being at a rate which allows mechanics or workmen to perform the necessary operations on the vehicle. As the vehicle reaches the means 13, the wheels engage the upwardly inclined portions 36 of the tracks 14 provided in the means 13, causing the vehicle to be lifted or elevated onto the horizontal portions 37 of the tracks and when the vehicle has thus been freed of the chains it is free to be operated over the inclined portions 37 of the tracks 14 to the level L or to any other point to which the portions 37 may extend. It will be obvious that the wheels of the vehicle may be repaired, in fact, removed while the vehicle is being carried by the chains.

Having described only a typical, preferred form of my invention, I do not wish to limit myself to the specific details set forth, but wish to reserve to myself any changes or variations that may appear to those skilled in the art or fall within the scope of the following claims.

Having described my invention, I claim:

1. Apparatus of the character described including means for elevating a vehicle a substantial distance from the normal level, and a chain conveyor receiving the vehicle from said means and carrying it horizontally in an elevated position with its wheels free, said means including an incline along which the vehicle is adapted to operate onto the conveyor.

2. Apparatus of the character described including, means for elevating a vehicle a substantial distance from the normal level, and a chain conveyor receiving the vehicle from said means and carrying it horizontally in an elevated position with its wheels free, said means including a runway to take the vehicle up and place it on the conveyor.

3. Apparatus of the character described including means for elevating a vehicle, and a chain conveyor receiving the vehicle from said means and carrying it horizontally in an elevated position with its wheels free, said means including a runway to take the vehicle up and then lower it onto the conveyor through its own motive power.

4. Apparatus of the character described including means for elevating a vehicle, and a conveyor receiving the vehicle from said means and carrying it horizontally in an elevated position with its wheels free, said means including a runway having an upwardly inclined part to take the vehicle up and a downwardly inclined part to lower the vehicle onto the conveyor.

5. Apparatus of the character described including means for elevating a vehicle, a conveyor receiving the vehicle from said means and carrying it in an elevated position with its wheels free, the said means including a runway having an upwardly-inclined part to take the vehicle up, and a downwardly-inclined part to lower the vehicle onto the conveyor, and means for receiving the vehicle from the conveyor and returning it to position for operation on its wheels, said last mentioned means including an inclined runway receiving the vehicle from the conveyor.

6. Apparatus of the character described including means for elevating a vehicle, and a chain conveyor receiving the vehicle from said means and carrying it in an elevated position with its wheels free, said means including a runway having an upwardly inclined part to take the vehicle up under its own power and a downwardly inclined part to lower the vehicle onto the conveyor, the conveyor including spaced parallel chains, sprockets carrying the chains, drive means for the chains, and means for supporting the vehicle carrying portions of the chains.

7. Apparatus of the character described including, a runway having an upwardly inclined portion over which a vehicle may be operated from a normal level to a substantial height, and having a decline portion, a horizontal chain conveyor adapted to receive a vehicle from said decline and advance it slowly with its wheels free, and a runway having an incline to receive the wheels of the vehicle advancing on the conveyor so as to support the vehicle by its wheels and having a decline down which the vehicle may be rolled to the normal level.

In witness that I claim the foregoing I have hereunto subscribed my name this 22nd day of April, 1929.

HAROLD W. LANGBEIN.